April 22, 1941.                 G. A. LYON                 2,239,366
                       WHEEL DISK AND WHEEL ASSEMBLY
                  Original Filed Dec. 17, 1934    2 Sheets-Sheet 1
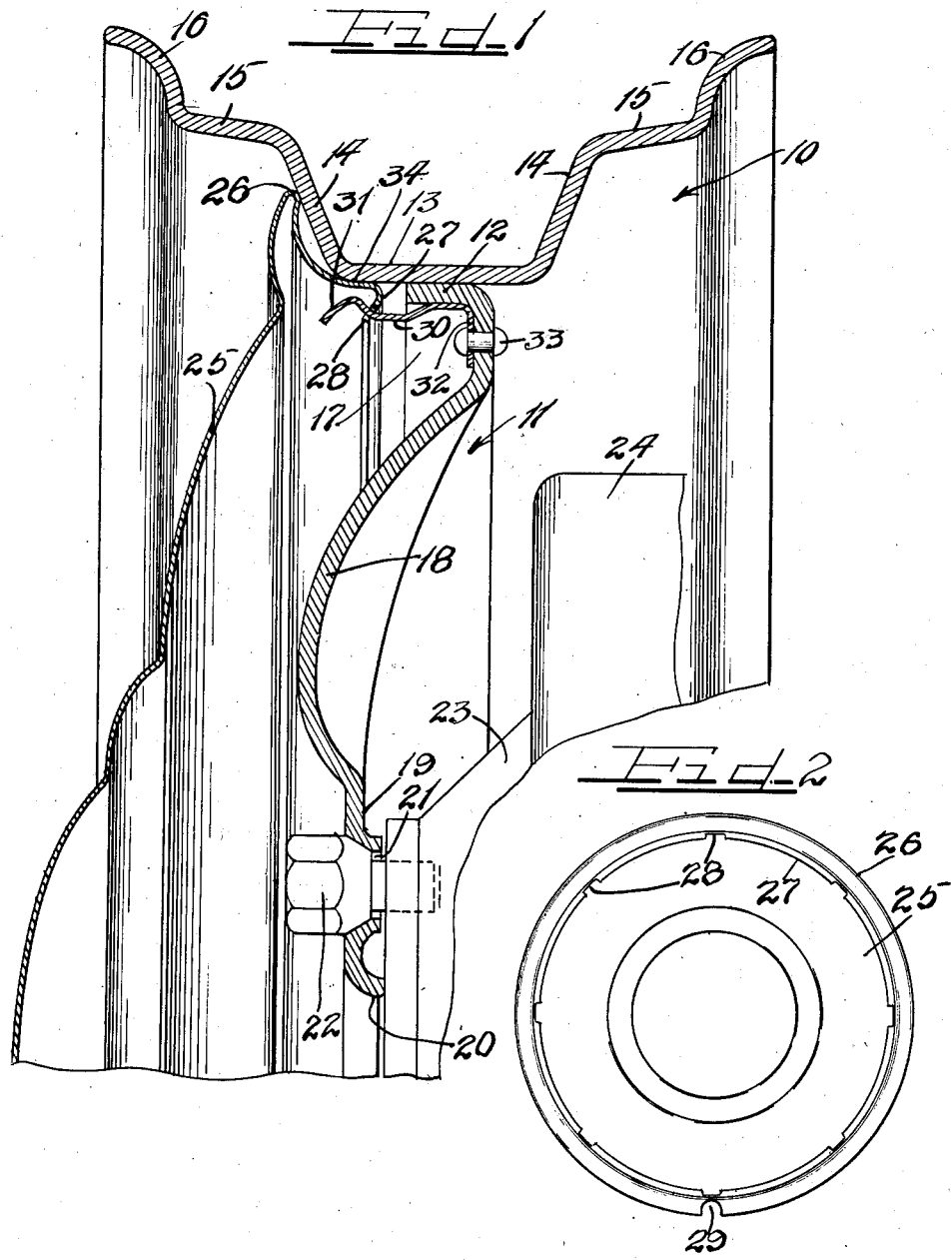

April 22, 1941.                G. A. LYON                2,239,366
WHEEL DISK AND WHEEL ASSEMBLY
Original Filed Dec. 17, 1934     2 Sheets-Sheet 2
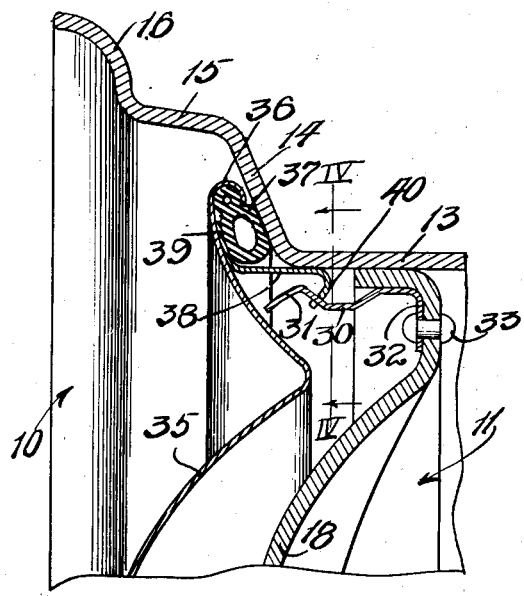
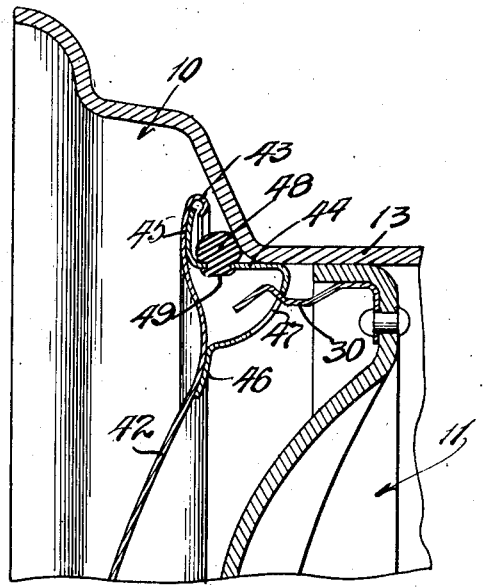
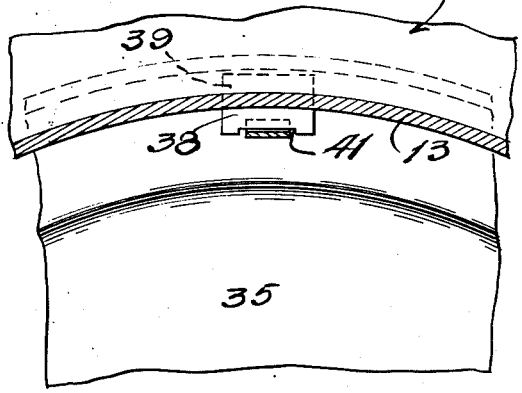
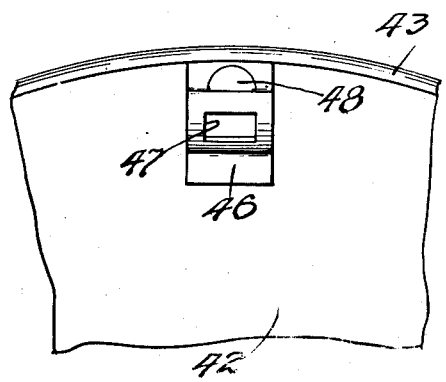
Inventor
George Albert Lyon Patented Apr. 22, 1941

2,239,366

UNITED STATES PATENT OFFICE 2,239,366

WHEEL DISK AND WHEEL ASSEMBLY

George Albert Lyon, Allenhurst, N. J.

Original application December 17, 1934, Serial No. 757,781. Divided and this application April 24, 1939, Serial No. 269,619

5 Claims. (Cl. 301—37)

This invention relates to improvements in an ornamental wheel disk, and more particularly to an ornamental disk for attachment to the side surface of a vehicle wheel within the rim of the wheel to override the outer side surface of the disk or spoke portion of the wheel. The invention further relates to an ornamental disk and wheel structure wherein the retaining engagement between the wheel and disk is adjacent to or a little inside of the wheel rim.

This application is a division of my co-pending application entitled "Ornamental wheel discs," U. S. Serial 757,781, filed December 17, 1934, now Patent No. 2,157,960.

It is an object of this invention to provide an ornamental disk of relatively thin sheet material and having an external surface finished or configurated in substantially any desired manner to harmonize with the other structure and adornments of a vehicle, which disk element is economical and expeditious to manufacture and may be associated with the wheel in a very ready manner.

Another object of the invention is to provide a disk adapted to be snapped axially into spring-retained engagement with an outer side of the wheel and which structure includes concealed spring elements adapted to adjust the disk to slight manufacturing tolerances allowed in the manufacture of the wheel.

It is also an object of this invention to provide an ornamental disk which may be positioned upon a wheel to cover the outer side surface of the wheel inside the outer edge of the rim, with the engagement means between the disk and the wheel adjacent the rim, and wherein the disk may be made to include as an integral part thereof the equivalent of a hub cap, in which instance the disk is removable from the wheel or, if desired, the wheel may be made so as not to include the equivalent of a hub cap portion.

It is also an object of this invention to provide an ornamental disk of the character described herein which may or may not be equipped with a cushioning or yieldable member for contact with the rim of the vehicle wheel as may be desired.

Another object of the invention is the provision of a new ornamental disk and wheel structure, the engagement between these parts being adjacent the rim of the wheel.

It is also an object of this invention to provide an ornamental disk for disposition over the surface of a vehicle wheel inside of the outer edge of the rim of the wheel, which disk incorporates as a part thereof yieldable means for contact with the wheel rim.

Other objects and features of this invention will more fully appear from the following description taken in connection with the accompanying drawings, in which:

Figure 1 is an enlarged fragmentary vertical sectional view, wherein the disk covers the entire outer side surface of the wheel inside the rim and the holding means for the disk are carried by the central supporting portion of the wheel;

Figure 2 is an inside elevational view of the disk shown in Figure 1;

Figure 3 is an enlarged sectional view, similar to Figure 1, but showing a different construction of disk held on the wheel by means carried by the central supporting portion of the wheel;

Figure 4 is a vertical sectional view taken substantially on the line IV—IV of Figure 3 looking in the direction of the arrow;

Figure 5 is a view similar to Figure 3, showing a still different form of disk construction, held upon the wheel by means carried by the central supporting portion of the wheel; and Figure 6 is an enlarged fragmentary inside elevational view of the portion of the disk shown in Figure 5.

I have illustrated in the above mentioned drawings three modifications of my invention, in each of which I have provided an ornamental disk and wheel structure and which disk is adapted to be snapped or pressed axially into retaining engagement with the wheel so as to be held in place on the wheel by means concealed by the disk.

In the first form of my invention which is illustrated in Figures 1 and 2 of the drawings, there is shown a wheel having the conventionally shaped drop center rim 10 and a body part 11 which is provided with an axially outwardly extending peripheral flange 12. The rim 10, as shown, includes a base flange 13, side flanges 14, intermediate flanges 15, and edge portions 16. The base flange 13 of the rim 10 is secured to the axially outwardly extending peripheral flange 12 of the body part 11 in any suitable manner, such as by riveting or welding.

At a sufficient distance radially inwardly of the flange 12 to leave a groove-like pocket 17 adjacent this flange, the body part is provided with a plurality of outwardly arced portions 18 in simulation of spokes. The body part 11 of the wheel is also provided with a radial fastening flange 19 at its center portion offset inwardly towards the median vertical plane of the wheel, the fastening flange having the usual hub opening 20 in the center thereof. As is clearly shown in Figure 1, the flange 19 is provided with a plurality of apertures 21 for the accommodation of a series of fastening bolts 22 by means of which the wheel may be attached to an axle part 23 having associated therewith the usual brake drum 24.

In the form of the invention illustrated in Figures 1 and 2, I have shown a disk 25, which, of necessity, must be removable from the wheel in a ready manner because the disk is made to cover the entire side surface of the body part of the wheel together with a portion of the rim, including the hub opening. The outer periphery of the disk 25 is provided with a reversed bend 26 which contacts with the rim 10. The outer marginal portion of the disk 25 curves inwardly from the bend 26 beneath the base 13 of the rim 10 and terminates in an outwardly bent annular flange 27, this flange being recessed or notched at spaced intervals as indicated at 28, for the accommodation of attaching means. As may be seen best in Figure 2, the reversely bent portion 26 of the disk 25 is provided with a suitable notch 29 through which the valve stem (not shown) may extend.

The attaching means for the disk 25 in this embodiment of the present invention are carried by the body parts 11 of the wheel and comprise a series of spring clips 30 having inwardly bent or hooked ends 31. The spring clips 30, which are of the size to fit within the notches 28 in the disk 25, also comprise an inwardly turned base portion 32 secured to the body part of the wheel in any desired manner, such, for example, as by rivets 33. The spring clips 30 are preferably seated in the groove-like pockets 17 of the body parts 11 which brings the clips immediately adjacent the rim of the wheel.

In mounting the disk 25 upon the wheel, it is a simple expedient to press the disk axially into engagement with the spring clips. The contacting surfaces of the spring clips slope inwardly and downwardly so that any jarring of the disk and wheel only results in a more positive engagement. Accordingly, the disk is firmly secured to the wheel. If so desired, a cushioning or yieldable contact means may be provided between the disk and wheel rim, as will presently be apparent from a discussion of the other two illustrated embodiments of the present invention. To remove the disk from the wheel, it is a simple expedient to insert a prying tool between the bend 26 and the rim, and by fulcruming the tool against the outer portion of the intermediate flange 15 of the rim (in which position the tool will not contact the tire upon the rim), the disk may be readily pried off the rim.

In connection with the form of the invention illustrated in Figures 1 and 2, it should also be noted that between the bend 26 and the flange 27 the disk is provided with an inwardly extending portion 34 which telescopes within the base 13 of the rim 10 and preferably contacts the rim in this region therearound. Such engagement with the rim aids in positioning the disk upon the wheel and also adds to the rigidity of retention of the disk.

In Figures 3 and 4 I have shown another form of disk attached to a wheel of the same construction as that illustrated in Figure 1. In this instance, the disk 35 may cover the entire outer side surface of the body part of the wheel, or it may be in the form of an annulus the intermarginal edge of which is supported on a radial inner portion of the body part 11 of the wheel (such, for example, as is illustrated and described in my co-pending application Serial 757,781, filed December 17, 1934, and from which this application has been divided). The outer marginal portion of the disk 35 is curved inwardly as at 36, to provide an undercut groove in which a cushioning or yieldable member 37 is seated. This member 37 is preferably of the form shown in Figure 3 wherein the cross sectional configuration of the cushioning member is in the form of a figure eight.

On the inner side of the disk 35 there is provided a series of engaging members 38 for cooperation with the spring clips 30 which are carried on the body parts 11 of the wheel to hold the disk in position on the wheel. Each of the engaging members 38 has a tail portion 39 welded or otherwise secured to the disk 35. The inner end of each of the engaging members 38 is bent inwardly and outwardly, as at 40, and notched, as at 41 (Figure 4), for reception of one of the spring clips 30. The disk 35 may be mounted upon and removed from the disk in the same manner as the disk shown in Figures 1 and 2, the central portions of the engaging members 38 telescoping with the undersurface of the base 13 of the rim 10.

In Figures 5 and 6, I have shown another disk structure associated with a wheel of the same type as illustrated in Figures 1 and 2. In this instance, a disk 42 is provided with an inwardly turned outer periphery 43, and a set of engaging elements 44 are provided, each of which includes a portion 45 shaped in conformity with the disk and extending beneath the turned periphery 43. This tail portion 45 of the engaging element 44 is welded or otherwise secured to the disk. Each engaging element 44 also has a portion 46 which is likewise secured to the disk at a point spaced below the portion 45. The central portion of each engaging element 44 extends inwardly for telescopic association with the base 13 of the rim 10 and then arcs downwardly to merge into the portion 46, the arcuate part being apertured or not, as at 47, to accommodate a spring clip 30 which is carried on the body part 11 of the wheel. In the horizontally extending portion thereof each engaging member 44 has a cushioning element 48 in the form of a button, preferably of live rubber, extending through a suitable aperture in the engaging member and having an expanded lower end 49 to hold the button in position. These buttons afford cushioning or yieldable contact with the rim and tend to eliminate unwelcome noises.

The mounting and removal of the disk 42 is the same as that of the disk 35 shown in Figures 3 and 4.

While I have shown particular embodiments of my invention, it will, of course, be understood that I do not wish to be limited thereto, since many modifications may be made, and I therefore contemplate by the appended claims to cover all such modifications as fall within the true spirit and scope of my invention.

The invention is claimed as follows:

1. In combination, an automobile wheel including rim and body parts, said wheel having a radially inwardly facing shoulder in proximity to the juncture of said rim and body parts and having attaching means thereon in close proximity to said shoulder, and a circular cover member of relatively thin metallic sheet material for disposition over a part of said wheel, the outer margin of said cover member having a portion connected thereto and extending along said member and then axially rearwardly forming a flange portion for intimate telescopic engagement with said shoulder, a rearward part of said flange portion being bent obliquely axially outwardly and radially inwardly for snap-on engagement with said attaching means on said wheel.

2. In combination, an automobile wheel including rim and body parts, said wheel having a radially inwardly facing shoulder in proximity to the juncture of said rim and body parts and having attaching means thereon in close proximity to said shoulder, and a circular cover member of relatively thin metallic sheet material for disposition over a part of said wheel, the outer margin of said cover member having a portion connected thereto and extending along said member and then axially rearwardly forming a flange portion for intimate telescopic engagement with said shoulder, a rearward part of said flange portion being bent obliquely axially outwardly and radially inwardly and being apertured, said attaching means on said wheel including an axially outwardly extending spring finger for engagement with the rearward part of said flange portion of said member within an aperture of said rearward part.

3. In combination, an automobile wheel including rim and body parts, said wheel having a radially inwardly facing shoulder in proximity to the juncture of said rim and body parts and having a plurality of resilient attaching elements extending axially outwardly in close proximity to said shoulder, and a circular cover member of relatively thin metallic sheet material for disposition over a part of said wheel, said cover member being provided with a plurality of axially rearwardly extending generally U-shaped strap elements each of said U-shaped strap elements including a leg portion arranged to telescopically engage said shoulder and a second leg portion having an aperture therein through which a resilient attaching element extends for holding said cover member in snap-on engagement on said wheel.

4. In combination, an automobile wheel including rim and body parts, said wheel having a radially inwardly facing shoulder in proximity to the juncture of said rim and body parts and having a plurality of resilient attaching elements extending axially outwardly in close proximity to said shoulder, and a circular cover member of relatively thin metallic sheet material for disposition over a part of said wheel, said cover member being provided with a plurality of axially rearwardly extending generally U-shaped strap elements each of said U-shaped strap elements including a leg portion arranged to telescopically engage said shoulder and a second leg portion having an aperture therein through which a resilient attaching element extends for holding said cover member in snap-on engagement on said wheel, said leg portion which telescopically engages said shoulder on each strap element having arranged thereover a wheel-engaging button element of resilient material for engaging said wheel.

5. In combination, an automobile wheel including rim and body parts, said wheel having a radially inwardly facing shoulder in proximity to the juncture of said rim and body parts and having a plurality of resilient attaching elements extending axially outwardly in close proximity to said shoulder, and a circular cover member of relatively thin metallic sheet material for disposition over a part of said wheel, said cover member being provided with a plurality of axially rearwardly extending elements arranged to telescopically engage said shoulder and to detachably interengage with a resilient attaching element on said wheel, each of said axially rearwardly extending elements on said cover member having a tail portion extending generally radially outwardly along said cover member and intimately overlying and contacting the rear face of said cover member and secured thereto.

GEORGE ALBERT LYON.